(12) United States Patent
Siddhartha

(10) Patent No.: US 11,243,822 B2
(45) Date of Patent: Feb. 8, 2022

(54) AUTOMATIC LINK BASED MESSAGE VERIFICATION

(71) Applicant: Google LLC, Mountain View, CA (US)

(72) Inventor: Sandeep Siddhartha, Kirkland, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/148,132

(22) Filed: Oct. 1, 2018

(65) Prior Publication Data
US 2020/0104192 A1   Apr. 2, 2020

(51) Int. Cl.
*G06F 9/54* (2006.01)
*H04W 4/50* (2018.01)
*G06F 3/0484* (2013.01)
*H04M 1/72406* (2021.01)

(52) U.S. Cl.
CPC .......... *G06F 9/542* (2013.01); *G06F 3/04842* (2013.01); *H04M 1/72406* (2021.01); *H04W 4/50* (2018.02)

(58) Field of Classification Search
CPC ...... G06F 9/542; G06F 3/04842; G06F 21/43; G06F 21/42; H04W 4/50; H04W 12/37; H04W 12/35; H04M 1/72525; H04M 1/72406; H04L 9/3271; H04L 2463/082; H04L 9/3228
USPC ...................... 709/217, 219; 726/7
See application file for complete search history.

(56) References Cited

U.S. PATENT DOCUMENTS

| | | | |
|---|---|---|---|
| 5,222,247 A * | 6/1993 | Breeden .................. | H04B 1/10 455/26.1 |
| 8,023,927 B1 | 9/2011 | Coleman et al. | |
| 2012/0331536 A1 * | 12/2012 | Chabbewal .......... | G06F 21/604 726/7 |
| 2014/0019582 A1 | 1/2014 | Kim | |
| 2015/0061832 A1 * | 3/2015 | Pavlovic ............ | G07C 9/00158 340/5.83 |

(Continued)

FOREIGN PATENT DOCUMENTS

CA   3010233 A1   7/2017

OTHER PUBLICATIONS

Automatic SMS Verification with the SMS Retriever API, Author Google Developers, Oct. 31, 2017.

(Continued)

*Primary Examiner* — David R Lazaro
*Assistant Examiner* — Mariegeorges A Henry
(74) *Attorney, Agent, or Firm* — Honigman LLP; Brett A. Krueger

(57) ABSTRACT

A method for automatically verifying a message using a remote system includes receiving, at a remote system, a request to launch an application from a current user to communicate where the request includes a unique feature associated with a potential user's device that is required for registration. The method includes generating a selectable-link, and transmitting a first message that includes the selectable-link to the potential user's device. The first message is configured to cause the potential user's device to display the link, launch the application in response to receiving selection indication of the selectable-link, and transmit a verification code to the remote system. The method further includes registering the potential user's device in response to receiving the verification code.

24 Claims, 9 Drawing Sheets

(56) References Cited

U.S. PATENT DOCUMENTS

| | | | |
|---|---|---|---|
| 2015/0236908 A1* | 8/2015 | Kim | H04L 41/0816 |
| | | | 709/221 |
| 2016/0117388 A1* | 4/2016 | Fan | G06F 16/248 |
| | | | 717/178 |
| 2017/0083534 A1* | 3/2017 | Strong | H04L 63/12 |
| 2017/0192982 A1* | 7/2017 | Glover | G06Q 30/0282 |
| 2017/0201850 A1* | 7/2017 | Raleigh | G06F 3/0482 |
| 2017/0270728 A1 | 9/2017 | Troesch et al. | |

OTHER PUBLICATIONS

Anonymous: "Viber—Get started: Viber setup", Aug. 15, 2018 (Aug. 15, 2018), XP055646602, Retrieved from the Internet: URL:https://support.viber.com/customer/en/portal /articles/1340165-get-started -vi ber- setup [retri eved on Nov. 26, 2019] the whole document.

'One-tap SMS verification with the SMS User Consent API', Google developer's guide, Jun. 8, 2017 (Jun. 8, 2017), pp. 1-2, XP055646752, Retrieved from the Internet: URL:https: //developers.google.com/identity/sms-retriever/user-consent/overviewl [retrieved on Nov. 26, 2019], the whole document.

International Search report for the related application No. PCT/US2019/052514 dated Sep. 23, 2019.

\* cited by examiner

AUTOMATIC LINK BASED MESSAGE VERIFICATION

TECHNICAL FIELD

This disclosure relates to automatic link-based message verification.

BACKGROUND

Telephone-based communication applications (apps) often allow one user to invite another user to use the application, but require manual registration by the user to participate. Typically, a user (the inviter) sends an invitation to the potential user based on a known identity of the potential user (e.g., an e-mail address) or based on a known feature associated with a user device of the potential user (e.g., a mobile phone number). The potential user may receive the invitation through a general communication method, such as e-mail or text message. To respond to the invitation, the potential user may first need to download, install, and initialize the communication app. The invitation may also contain a verification code. After initializing the communication app, the potential user may be required to transfer the verification code to the communication app to accept the invitation, e.g. by copying the verification code from the text message and pasting it into an input field provided by the initialized communication app or by manually transcribing the verification code into the communication app. After the potential user successfully accepts the invitation, the inviter and potential user may be able to communicate via the communication app.

SUMMARY

One aspect of the disclosure provides a method for generating a message that allows for automatic verification of a feature of a user device. The method includes receiving, at data processing hardware, a request to launch an application on a user device. The request includes a unique feature associated with the user device and the unique feature is required for registering the user device with the application. The method also includes generating, by the data processing hardware, a selectable-link for launching the application on the user device. The selectable-link includes an application identifier identifying the application and a verification code used to verify that the unique feature is associated with the user device. The method further includes transmitting, at the data processing hardware, a first message that includes the selectable-link to the user device using the unique feature. The first message, when received by the user device, is configured to cause the user device to display the selectable-link on a graphical user interface executing on the user device. The first message is also configured to launch the application using the application identifier after receiving a selection indication indicating selection of the selectable-link displayed on the graphical user interface and transmit a verification code. The verification code is transmitted to the data processing hardware in response to the user device receiving confirmation to register the user device with the application. The method also includes registering, by the data processing hardware, the user device with the application in response to receiving the verification code from the user device.

Implementations of the disclosure may include one or more of the following optional features. In some implementations, the first message, when received by the user device, is further configured to cause the user device to display a confirmation button in the graphical user interface after launching the application. The confirmation button, when selected by a user of the user device, indicates confirmation by the user to register the user device with the application and causes the user device to transmit the verification code to the data processing hardware without requiring user input of the verification code. In some examples, registering the user device with the application when the verification code is received from the user device includes determining whether a period of time from when the first message is transmitted to the user device until the verification code is received from the user device satisfies a validity period threshold. When the period of time satisfies the validity period threshold, the method includes registering the user device with the application. Alternatively, when the period of time dissatisfies the validity period threshold, the method includes preventing registration of the user device with the application The method may also include, when the period of time dissatisfies the validity period threshold, transmitting a second message to the user device using the unique feature. The second message includes a new verification code used to verify that the unique feature is associated with the user device. Optionally, the selectable-link includes a deep link that, when selected, prompts the user device to install the application when the application is not already installed on the user device and/or open the application when the application is already installed on the user device. In some embodiments, the first message, when received by the user device, is further configured to, after launching the application, populate the application with the unique feature associated with the user device. The unique feature may include a phone number. In some examples, the method further includes, after registering the user device with the application, transmitting a second message to the user device. The second message, when received by the user device, is configured to cause the user device to notify a user of the user device that the user device is successfully registered with the application.

Another aspect of the disclosure provides a method that includes receiving, at data processing hardware of a user device, a first message that includes a selectable-link for verifying a telephone number associated with the user device. The selectable-link includes metadata corresponding to the telephone number and a verification code used to verify that the telephone number is associated with the user device. The method also includes displaying, by the data processing hardware, the selectable-link in a graphical user interface executing on the user device and receiving, at the data processing hardware, a selection indication indicating selection of the selectable-link displayed on the graphical user interface. After receiving the selection indication, the method includes transmitting, by the data processing hardware, the verification code over a network to a service in communication with the data processing hardware. The verification code is configured to, in response to the service receiving the verification code, cause the service to verify that the telephone number is associated with the user device.

Implementations of the disclosure may include one or more of the following optional features. In some implementations, the selectable-link further includes an application identifier identifying an application that requires the telephone number associated with the user device for registering the user device with the application. The method then further includes, in response to receiving the selection indication, launching, by the data processing hardware, the application on the user device using the application identifier and populating, by the data processing hardware, the application with the telephone number associated with the user device. After receiving the selection indication indicating selection of the selectable-link, the method may include displaying, by the data processing hardware, a confirmation button on the graphical user interface and receiving, at the data processing hardware, a second selection indication indicating selection of the confirmation button to verify that the telephone number is associated with the user device. In response to receiving the second selection indication, the method then includes automatically transmitting, by the data processing hardware, the verification code to the service without requiring user input of the verification code.

In some examples, the method includes, prior to receiving the first message, transmitting, by the data processing hardware, a request to the service requesting to launch an application on the user device and/or access a resource. The request includes the telephone number associated with the user device and the service uses the telephone number received by the request to transmit the first message to the user device.

Another aspect of the disclosure provides a system including data processing hardware and memory hardware in communication with the data processing hardware. The memory hardware stores instruction that when executed on the data processing hardware cause the data processing hardware to perform operations. The operations include receiving a request to launch an application on a user device. The request includes a unique feature associated with the user device and the unique feature is required for registering the user device with the application. The operations also include generating a selectable-link for launching the application on the user device. The selectable-link includes an application identifier identifying the application and a verification code used to verify that the unique feature is associated with the user device. The operations further include transmitting a first message that includes the selectable-link to the user device using the unique feature. The first message, when received by the user device, is configured to cause the user device to display the selectable-link on a graphical user interface executing on the user device. The first message is also configured to launch the application using the application identifier after receiving a selection indication indicating selection of the selectable-link displayed on the graphical user interface and transmit a verification code. The verification code is associated with the verification code and is transmitted to the data processing hardware in response to the user device receiving confirmation to register the user device with the application. The operations also include registering the user device with the application in response to receiving the verification code from the user device.

Implementations of the disclosure may include one or more of the following optional features. In some implementations, the first message, when received by the user device, is further configured to cause the user device to display a confirmation button in the graphical user interface after launching the application. The confirmation button, when selected by a user of the user device, indicates confirmation by the user to register the user device with the application and causes the user device to transmit the verification code to the data processing hardware without requiring user input of the verification code. In some examples, registering the user device with the application when the verification code is received from the user device includes determining whether a period of time from when the first message is transmitted to the user device until the verification code is received from the user device satisfies a validity period threshold. When the period of time satisfies the validity period threshold, the operations include registering the user device with the application. Alternatively, when the period of time dissatisfies the validity period threshold, the operations include preventing registration of the user device with the application The operations may also include, when the period of time dissatisfies the validity period threshold, transmitting a second message to the user device using the unique feature. The second message includes a new verification code used to verify that the unique feature is associated with the user device. Optionally, the selectable-link includes a deep link that, when selected, prompts the user device to install the application when the application is not already installed on the user device and/or open the application when the application is already installed on the user device. In some embodiments, the first message, when received by the user device, is further configured to, after launching the application, populate the application with the unique feature associated with the user device. The unique feature may include a phone number. In some examples, the operations further include, after registering the user device with the application, transmitting a second message to the user device. The second message, when received by the user device, is configured to cause the user device to notify a user of the user device that the user device is successfully registered with the application.

Another aspect of the disclosure provides a system including data processing hardware of a user device and memory hardware in communication with the data processing hardware. The memory hardware stores instruction that when executed on the data processing hardware cause the data processing hardware to perform operations. The operations include receiving a first message that includes a selectable-link for verifying a telephone number associated with the user device. The selectable-link includes metadata corresponding to the telephone number and a verification code used to verify that the telephone number is associated with the user device. The operations also include displaying the selectable-link in a graphical user interface executing on the user device and receiving a selection indication indicating selection of the selectable-link displayed on the graphical user interface. After receiving the selection indication, the operations include transmitting the verification code over a network to a service in communication with the data processing hardware. The verification code is configured to, in response to the service receiving the verification code, cause the service to verify that the telephone number is associated with the user device.

Implementations of the disclosure may include one or more of the following optional features. In some implementations, the selectable-link further includes an application identifier identifying an application that requires the telephone number associated with the user device for registering the user device with the application. The operations then further include, in response to receiving the selection indication, launching the application on the user device using the application identifier and populating the application with the telephone number associated with the user device. After receiving the selection indication indicating selection of the selectable-link, the operations may include displaying a confirmation button on the graphical user interface and receiving a second selection indication indicating selection of the confirmation button to verify that the telephone number is associated with the user device. In response to receiving the second selection indication, the operations then include automatically transmitting the verification code to the service without requiring user input of the verification code.

In some examples, the operations include, prior to receiving the first message, transmitting a request to the service requesting to launch an application on the user device and/or access a resource. The request includes the telephone number associated with the user device and the service uses the telephone number received by the request to transmit the first message to the user device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Telephone-based communication applications (apps) generally require a current user to invite a potential user to participate. Typically, an inviter (e.g., a current user of the application) sends an invitation to a potential user based on a known identity of the potential user or based on a known feature associated with the potential user (e.g., a mobile phone number, email address, username, etc.). After the potential user receives the invitation on a user device and accepts the invitation, the application verifies ownership or control of the feature of the user device (e.g., the phone number of the user device). Generally, the application (or a service associated with the application) will send a message, for example through Short Message Service (SMS), containing a verification code to the user device. To verify the known identity or the known feature, the potential user must undertake the inefficient process of opening the message, obtaining the verification code, installing (if not previously installed) and executing the application, and providing the verification code (e.g., via manual entry or copy and pasting). Implementations of the present disclosure solve these technical inefficiencies by generating a message with sufficient information to allow the user device to automate several of the aforementioned steps.

Figure 1:
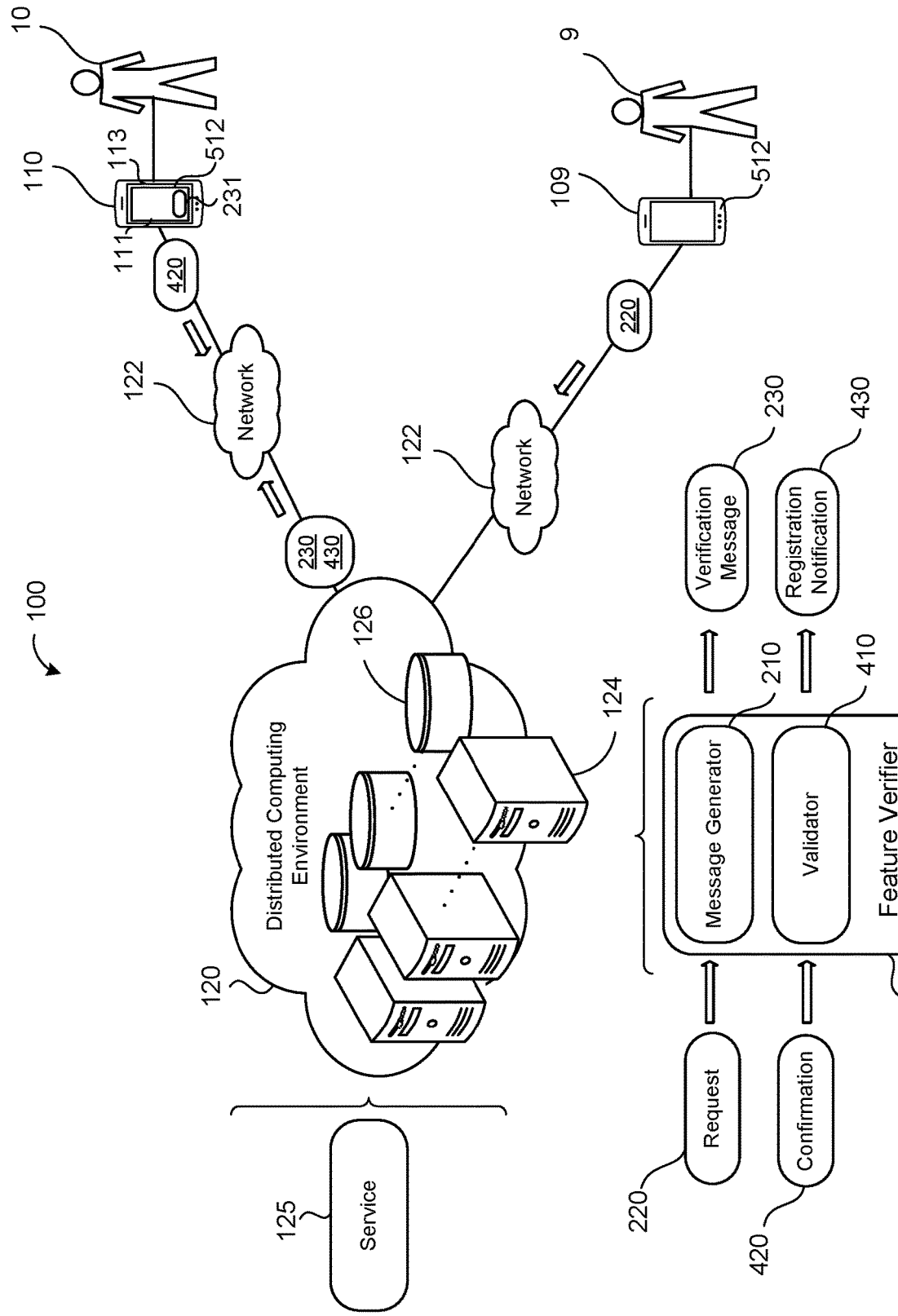
FIG. 1 is a schematic view of an example system for link-based feature verification.

Implementations herein are directed toward a feature verifier configured to generate a message that allows for automatic verification of a feature (e.g., a phone number) of a user device. Referring to FIG. 1, in some implementations, an example system 100 includes one or more user devices 109, 110 associated with an inviter 9 and a user 10 and in communication with a remote system 120 via a network 122. User devices 109, 110 include mobile devices such as smart phones, tablets, smart watches. The remote system 120 may be a single computer, multiple computers, or a distributed system (e.g., a cloud environment) having scalable/elastic computing resources 124 (e.g., data processing hardware) and/or storage resources 126 (e.g., memory hardware). The network 122 may be a global communications network, such as the Internet. While FIG. 1 illustrates the user devices 109, 110 communicating via the same network 122, the user devices 109, 110 may communicate with the remote system 120 via different networks. In some examples, the network is a telephone network supporting SMS, Multimedia Messaging Service (MMS), Universal Profile for Rich Communication Services (RCS or 'Chat'), or any other suitable communication protocol. In some examples, an inviter 9 desires to communicate with a user 10 via a phone-based communication application (app). The communication app may be used to communicate by speech, text, photo file sharing, or other forms of communication. In the example shown, the inviter 9 invites the user 10 to communicate using a mobile application 512 that executes on the user device 110. For instance, the user device 109 of the inviter 9 may invite the user 10 to communicate using the mobile application 512 by sending to the remote system 120 a registration request 220 that invites the user 10 to at least one of register or launch the mobile application 512 on the user device 110 associated with the user 10 to facilitate communications with the inviter 9. In some examples, a service 125 associated with the application 512 receives the registration request 220 from the user device 109 associated with the inviter 9 and sends the registration request 220 to a feature verifier 130 executing on the remote system 120. In some examples, the service 125 associated with the application 512 executes on the remote system 120 and implements the feature verifier 130.

In the example shown, the remote system 120 executes the feature verifier 130 that receives the registration request 220 from the inviter 9. The feature verifier 130 may implement a message generator 210 and a validator 410. The message generator 210 is configured to processes the registration request 220 received from the user device 109 or another device associated with the inviter 9, such as a desktop computer, laptop computer, tablet, or other computing device.

As described in more detail below, the message generator 210 produces a verification message 230 based on the registration request 220. The remote system 120 sends the verification message 230 to the user device 110 of the user 10. The verification message 230 includes a selectable-link 231. In the example shown, the user device 110 executes a graphical user interface 111 that displays the selectable-link 231 on a screen 113 of the user device 110 in response to receiving the verification message 230. The user device 110 may receive a selection indication indicating selection of the selectable-link 231 (e.g., via an input by the user 10) to install, launch, and/or register the application 512 (as described in more detail below). In some examples, the feature verifier 130 receives a confirmation message 420 from the user device 110 after the user device 110 receives the verification message 230. Here, the validator 410 of the feature verifier 130 is configured to process the confirmation message 420 and generate a registration notification 430 based on the confirmation message 420. In some examples, the validator 410 registers the user 10 with the online service 125 associated with the mobile application 512. The remote system 120 then sends the verification notification 430 to the user device 110 of the user 10 to notify the user 10 that the user device 110 and/or the associated unique feature 222 (FIG. 2) is successfully registered with the mobile application 512 and/or the associated service 125. For instance, the service 125 may be a communication service that allows two or more user devices 109, 110 to use the mobile application 512 to communicate with each other via telephony or messaging (e.g., voice or text) when the mobile application 512 is installed on, and registered with, the corresponding user devices 109, 110. The remote system 120 may also notify the inviter 9 (or any other users) of successful registration.

The registration request 220 may also come from other users, including from the user 10, e.g., for two-factor authentication. For example, the user 10 may request access to a resource or application 512 (e.g., a banking application) on user device 110 that requires verification of the user's 10 possession of the user device 110 as verification in addition to, for example, a username and password. In this example, the user 10 may request access to the resource or application 512 and in turn, the remote system 120 may receive the request (in this case a request for authentication) from the user device 110 or an affiliated service 125. The remote system 120 may then generate a verification message 230 to transmit to the user device 110 that includes the selectable-link 231. The user 10 may then indicate selection of the selectable-link 231 to verify possession of the user device 110. The message 230 may be configured to supply a verification code 236 (FIG. 2) to the requesting application 512 (i.e., the banking application) along with other potentially relevant information (e.g., username) without requiring the user 10 to enter the information.

Figure 2:
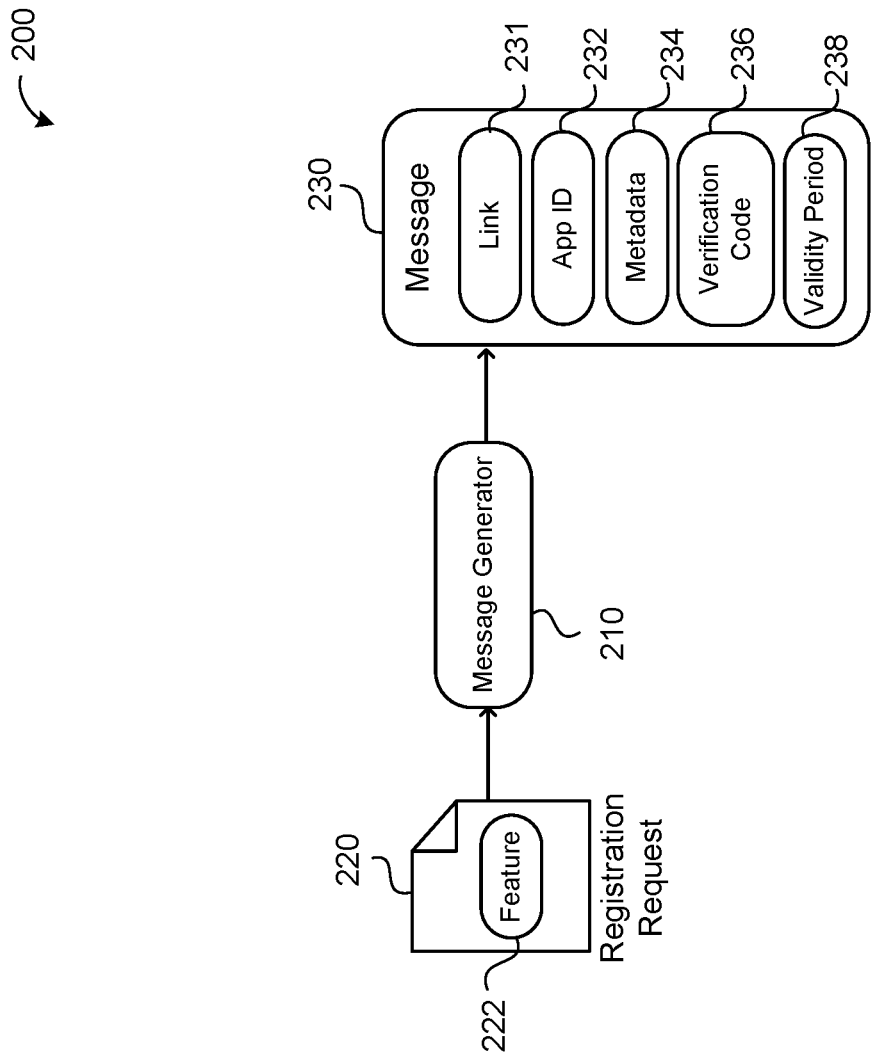
FIG. 2 is a schematic view of example components of a message generator of the system of FIG. 1.
Figure 5:
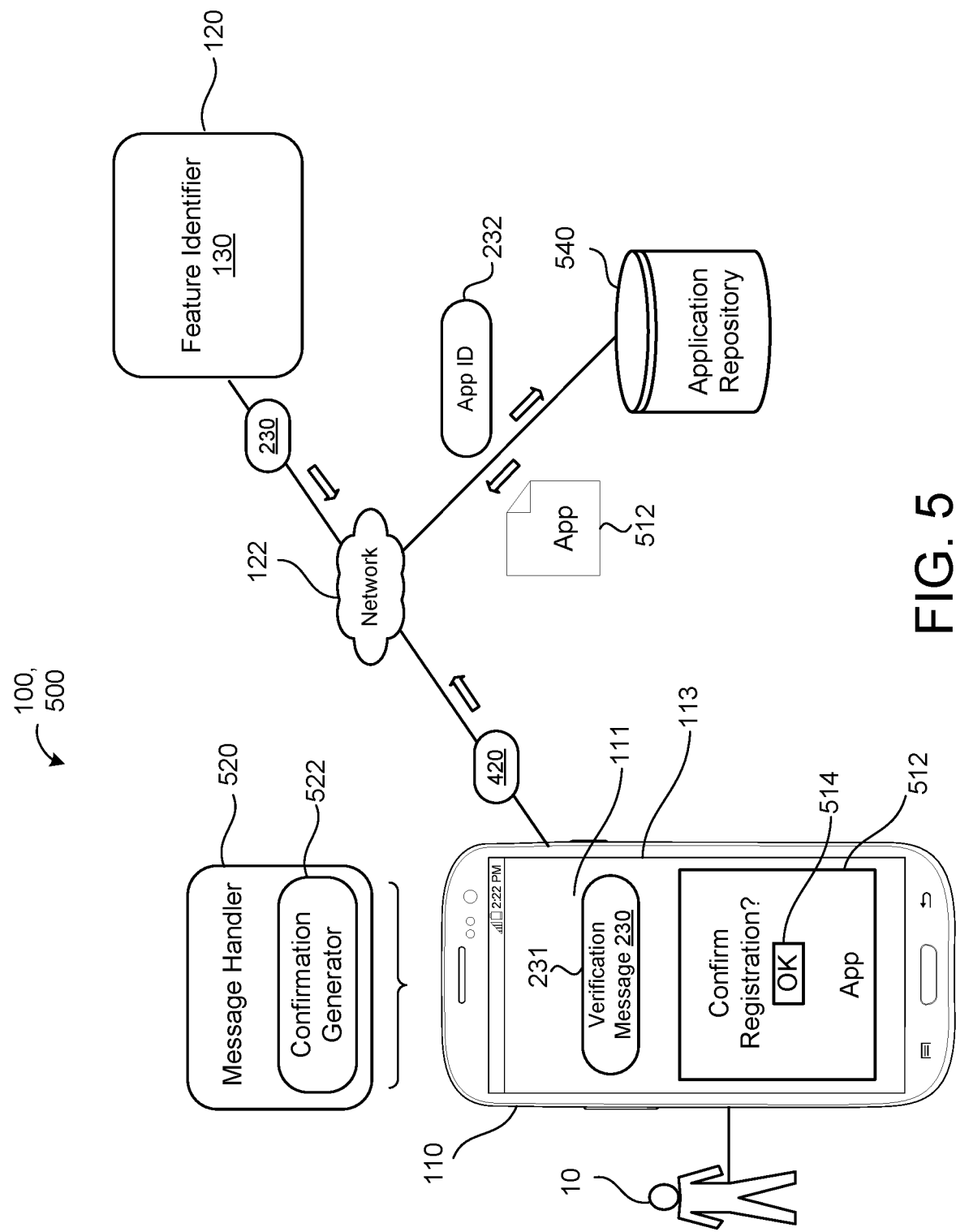
FIG. 5 is a schematic view of interaction between a user device and a feature verifier of the system of FIG. 1 for link-based feature verification.

FIG. 2 shows a schematic view 200 of the message generator 210. The message generator 210 receives the registration request 220 from, for example, the user device 109 of the inviter 9 through the application 512 executing on the user device 109. The registration request 220 includes a unique feature 222 that is associated with the user device 110 of the user 10. The unique feature 222 is required for registering the user device 110 with the application 512 and/or using the application 512 (e.g., the unique feature 222 may verify ownership or control of the user device 110). In some examples, the unique feature 222 is a phone number 342 (FIG. 3) associated with the user device 110. Alternatively, the unique feature 222 is an email address, user name, media access control (MAC) address, or some other feature/identifier associated with the user device 110. In response to receiving the registration request 220, the message generator 210 generates a verification message 230. The verification message 230 includes an application identification (ID) 232 that identifies the mobile application 512 that is requesting registration with the user device 110. In some examples, the application ID 232 is a unique name or number associated with the app 512 and is obtained by the message generator 210 through an online application repository 540 (FIG. 5). However, other forms of application ID 232 are possible. The verification message 230 also includes metadata 234 associated with the unique feature 222 of the user device 110 and a verification code 236. The metadata 234 associated with the feature 222 may be used, for example, to launch and/or initialize the application 512 for execution on the user device 110. The verification code 236, as described in more detail below, may be a combination of letters, symbols, and/or numbers that is uniquely associated with the verification message 230. Optionally, the verification message 230 may further include a validity period 238 that is used to establish an expiry of the message 230, such that the verification code 236 is invalid at the expiration of the validity period 238. In some examples, the verification message 230 includes a token that indicates the validity period 238 of the verification code 236.

In some implementations, the message generator 210 configures the verification message 230 to cause the user device 110 to display the verification message 230 as a selectable-link 231 (FIGS. 1 and 5) on the graphical user interface (GUI) 111 (FIG. 1) that executes on the user device 110 for display on the screen 113 (FIG. 1). When the GUI 111 receives a selection indication indicating selection of the selectable-link 231 displayed thereon, the verification message 230 is then configured to install (if not previously installed on the user device 110) and launch the application 512 on the user device 110 using the application ID 232. Once the application 512 is launched by the user device 110, the GUI 111 executing on the user device 110 may display a confirmation notification (514) that requests/prompts the user 10 to consent to register the user device 110 with the application 512. For instance, the GUI 111 may prompt the user 10 to select a button, provide a speech input, or some other user input that indicates that the user 10 consents to registering the user device 110 and/or the associated unique feature 222 with the application 512. Thereafter, the user device 110 may transmit the confirmation message 420 (FIGS. 1 and 4) to the feature verifier 130 indicating that the user 10 consents to registering the user device 110 and/or the associated unique feature 222 with the application 512. In some embodiments, registration may occur without requiring the user consent beyond indicating selection of the selectable-link 231 (i.e., the GUI 111 does not prompt the user 10 to provide additional confirmation).

Figure 3:
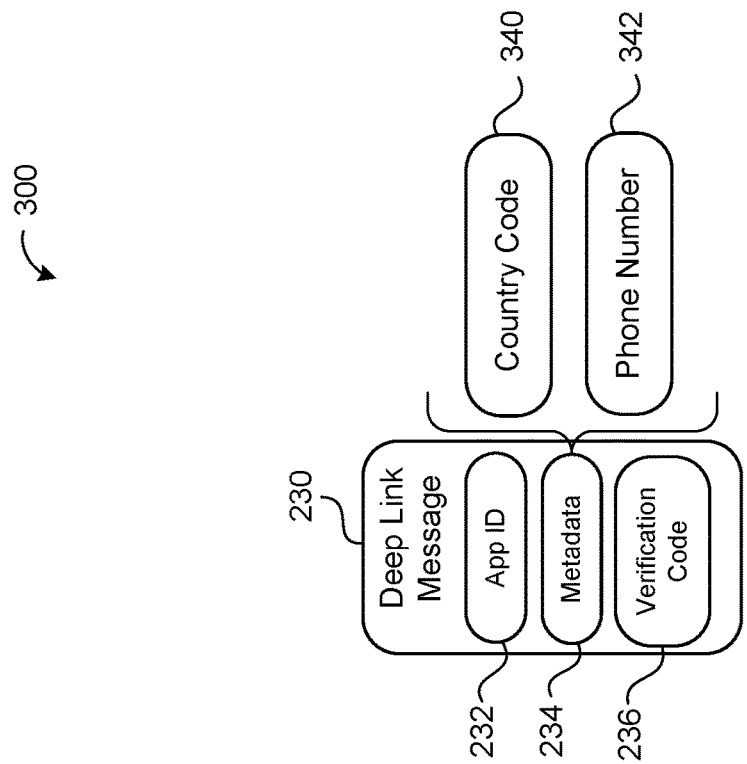
FIG. 3 is a schematic view of an example message associated with link-based feature verification systems.

Referring to FIG. 3, in some implementations, a schematic view 300 shows the verification message 230 including a deep link (e.g., a Firebase Dynamic Link) that provides information (e.g., app ID 232, metadata 234, and verification code 236) sufficient for allowing the user device 110 to automatically install and/or launch the application 512 and populate the necessary registration information for registering the unique feature 222 and/or the associated user device 110 with the application 512. For example, the metadata 234 may include a country code 340 and phone number 342 associated with the user device 110.

Figure 4:
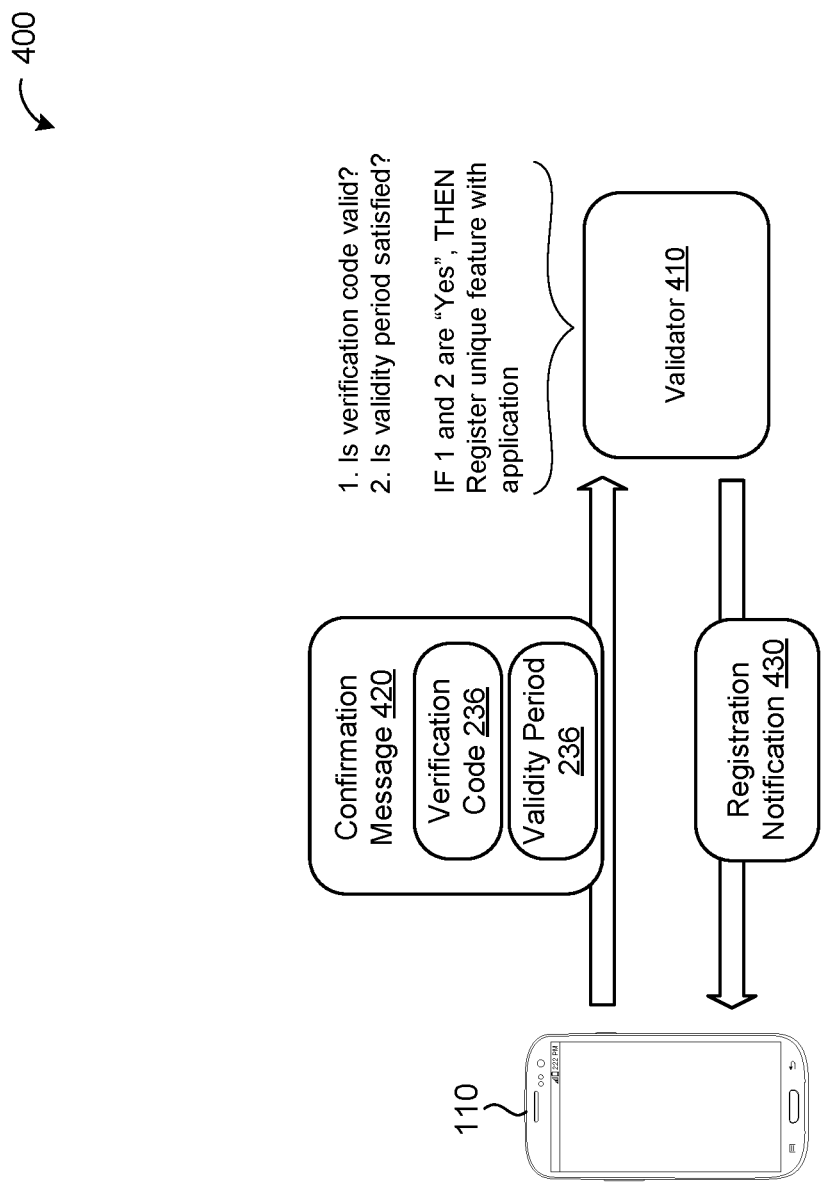
FIG. 4 is a schematic view of example components of a message validator of the system of FIG. 1.

FIG. 4 shows a schematic view 400 of the validator 410 of the feature verifier 130 receiving a confirmation message 420 from the user device 110 and determining whether or not register the unique feature 222 and/or the user device 110 with the application 512 based on the received confirmation message 420. The confirmation message 420 may be generated by, and sent from, the user device 110 after the user 10 of the user device 110 consents to register the unique feature 222 and/or the user device 110 with the application 512. The confirmation message 420 confirms acceptance by the user 10 and/or the application 512 that the feature 222 associated with the user device 110 is verified and that the user 10 consents to register the unique feature 222 with the application 512. For instance, the confirmation message 420 includes the verification code 236 (or a code associated with verification code 236) generated by the message generator 210 and included in the verification message 230 previously sent to the user device 110. Thus, in response to receiving the confirmation message 420, the validator 410 is configured to first determine if the verification code 236 is valid (e.g., matches the verification code 236 provided in the verification message 230) for verifying the unique feature 222. Validity of the verification code 236 may further require that the verification code 236 has not previously been confirmed as used, i.e., to prevent reuse of the same verification code 236. Optionally, the validator 410 may determine whether the validity period 238 associated with the verification code 236 is satisfied (e.g., unexpired). For example, the validator 410 may determine whether a period of time from when the message 230 is transmitted to the user device 110 to when the confirmation message 420 is received from the user device 110 satisfies the validity period 238. For instance, the validity period 238 may be satisfied when the period of time is less than the validity period 238. The period of time may simply include a designated time at which the verification code 236 must be received by the validator 410 before determining that the verification code 236 has expired. The confirmation message 420 may include a single token indicating the verification code 236 and the validity period 238 associated with the verification code 236. In some examples, the validity period 238 is not included in the confirmation message 420 and the validator 410 obtains the validity period 238 by accessing a log that maps verification codes 236 (or other unique identifying features of the message 230) to associated validity periods 238. Upon determining that the verification code 236 received in the confirmation message 420 is valid and the validity period 238 (when applicable) associated with the verification code 236 is satisfied, the validator 410 may register the unique feature 222 and/or the user device 110 with the application 512 and/or the online service 125 associated with the application 512 (or provide the information necessary for another service to register the feature 222 and/or user device 110). In the examples shown, the validator 410 of the feature verifier 130 generates and sends the registration notification 430 to the user device 110 to inform the user 10 that the unique feature 222 and/or the user device 110 was successfully registered with the application 512. On the other hand, when the validator 410 determines that the validity period 238 for the verification code 236 has expired (e.g., unsatisfied) or that the verification code 236 has been previously used, the validator 410 prevents registration by the user device 110 with the application 512. In some examples, when the period of time from when the message 230 is transmitted dissatisfies the validity period 238, a second message is transmitted to the user device 110 using the unique feature 222. The second message includes a new verification code 236 used to verify that the unique feature 222 is associated with the user device 110. The validity period 238 may also be referred to as a validity period threshold 238. After one or more failures to register (e.g., the validity period 238 is dissatisfied), the user 10 may be required to manually enter the new verification code 236 from the second (or subsequent) message.

Referring to the schematic view 500 of FIG. 5, in some implementations, the system 100 includes the user device 110 in communication with the feature verifier 130 and an application repository 540. The feature verifier 130 may execute on the remote system 120 and communicate with the user device 110 via the network 122. In the example shown, the user device 110 may include the user device 110 associated with the user 10 of FIG. 1. The example shows the user device 110 receiving the verification message 230 from the feature verifier 130 that is requesting verification to register the unique feature 222 associated with the user device 110 with the application 512. The feature verifier 120 uses the unique feature 222 (e.g., telephone number) associated with the user device 110 to transmit (e.g., via a text message sent to the telephone number 222) the verification message 230 to the user device 110.

In response to receiving the verification message 230, the user device 110 displays the verification message 230 on the GUI 111 as a selectable-link 231, that when selected by the user 10, causes the user device 110 to launch the application 512 identified by the application identifier 232 included in verification message 230. In some examples, the user device 110 simply launches the application 512 in response to receiving the verification message 230 without requiring the user 10 select a selectable-link 231 corresponding to the verification message 230. The user device 110 may execute a message handler 520 for processing the verification message 230 upon receipt. In scenarios when application 512 is not already installed on the user device 110, the message handler 520 may (automatically or via user prompt) obtain (e.g., via download) the application 512 from, for example, the application repository 540 for installation on the user device 110. After the application 512 launches, i.e., initiates execution on the user device 110, the application 512 obtains registration information from the verification message 230 for registering the unique feature 222 (e.g., country code 340 and telephone number 342) and/or the user device 110 with the application 512. In some implementations, when user device 110 launches the application 512, the application 512 displays a confirmation notification 514 on the GUI 111 displayed on the screen 113 of the user device 110 that allows the user 10 to confirm registration of the unique feature 222 and/or user device 110 with the application 512. The confirmation notification 514 may include a graphical element (e.g., button) that the user 10 may select to confirm registration. Additionally or alternatively, the confirmation notification 514 may include a prompt (visual and/or audio) that prompts the user 10 to confirm registration by providing a manual input (e.g., tapping a graphical element on the GUI 111, pressing a physical button on the user device 110, performing a gesture on the GUI 111 or proximate to the user device 110, providing a speech input, moving the user device 110 in a prescribed manner, etc.). The message handler 520 may implement a confirmation generator 522 configured to generate and transmit the confirmation message 420 to the remote system 120 in response to the user device 110 receiving the selection indication indicating confirmation by the user 10 to register the user device 110 and/or the associated unique feature 222 with the application 512. As used herein, the selection indication received by the user device 110 causes the user device 110 to generate and send the confirmation message 420 to the validator 410 (FIG. 4) that includes the verification code 236 for use in verifying and registering the unique feature 222 with the application 512.

Figure 6:
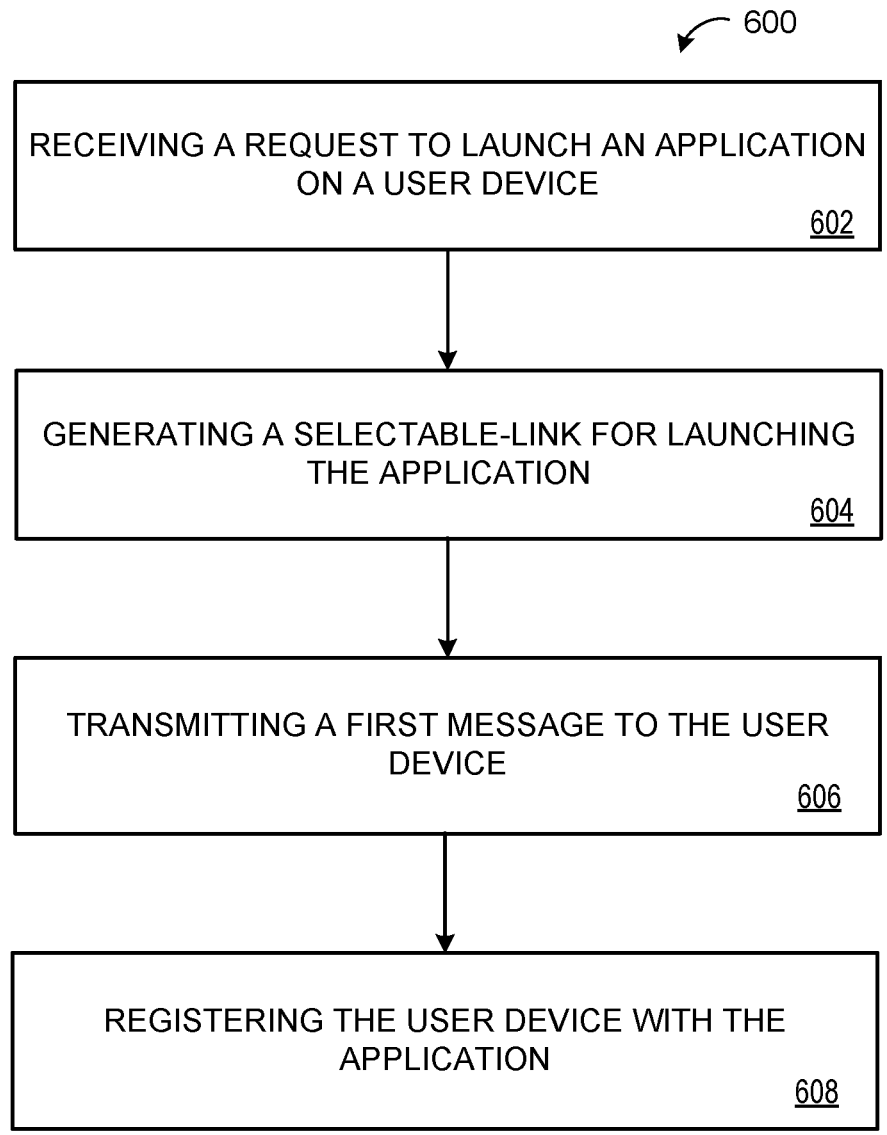
FIG. 6 is a flowchart of an example method for automatic link-based feature verification.

FIG. 6 is a flowchart of an example method 600 for generating a message 230 that allows for automatic verification of a feature 222 of a user device 110. The flowchart starts at operation 602 by receiving, at data processing hardware 810 (FIG. 9), a request 220 to launch an application 512 on a user device 110. The request 220 includes the unique feature 222 associated with the user device 110 and the unique feature 222 is required for registration with the application 512 for use of the application 512 on the user device 110. The unique feature 222 may include a phone number 342 and associated country code 340. The unique feature 222 may optionally include a user name, email address, MAC address, or some other feature that uniquely identifies the user device 110. The method 600 also includes, at operation 604, generating, by the data processing hardware 810, a selectable-link 231 configured to launch the application 512 on the user device 110. The selectable-link 231 includes an application identifier 232 that identifies the application 512. The selectable-link 231 also includes a verification code 236 used to verify that the unique feature 222 is associated with the user device 110. The selectable-link 231 may include a deep link that, when selected, causes the user device 110 to install the application 512 when the application 512 is not already installed on the user device 110 and/or open the application 512 when the application 512 is already installed on the user device 110. The verification message 230 may include the selectable-link 231.

At operation 606, the method 600 includes transmitting a first message (e.g., verification message) 230 that includes the selectable-link 231 to the user device 110 using the unique feature 222. For instance, the unique feature 222 may be a phone number 342 associated with the user device 110 that the data processing hardware 810 uses to send the first message 230. The first message is configured to cause the user device 110 to display the selectable-link 231 on the GUI 111 displayed on the screen 113 of the user device 110 and launch the application 512 using the application identifier 232 after receiving a selection indication indicating selection of the selectable-link 231 displayed on the GUI 111. In some examples, the first message 230, when received by the user device 110, is further configured to, after launching the application 512, populate the application 512 with the unique feature 222 associated with the user device 110. The verification code 236 is transmitted to the data processing hardware 810 in response to the user device 110 receiving confirmation to register the user device 110 with the application 512. In some implementations, the first message 230, when received by the user device 110, is further configured to cause the user device 110 to display a confirmation notification 514 in the GUI 111 once the application 512 launches. The confirmation notification 514 may include a button, that when selected by a user 10 of the user device 110, indicates confirmation by the user 10 to register the user device 110 with the application 512 and causes the user device 110 to transmit the verification code 236 to the data processing hardware 810 without requiring user input of the verification code 236.

The method 600 includes, at operation 608, registering, by the data processing hardware 810, the user device 110 with the application 512 in response to receiving the verification code 236 from the user device 110. In some examples, registering the user device 110 with the application 512 when the verification code 236 is received from the user device 110 includes determining whether a period of time from when the first message 230 is transmitted to the user device 110 until the verification code 236 is received from the user device 110 satisfies a validity period threshold 238 associated with the verification code 236. When the period of time satisfies the validity period threshold 412, the user device 110 is registered with the application 512. Alternatively, when the period of time dissatisfies the validity period threshold 412, the data processing hardware 810 prevents registration by the user device 110 with the application 512. When the period of time dissatisfies the validity period threshold, the method 600 may include transmitting a second message to the user device 110 using the unique feature 222. The second message may include a new verification code 236 used to verify that the unique feature 222 is associated with the user device 110.

In some implementations, the method 600 includes, after registering the user device 110 with the application 512, transmitting a second message 430 to the user device 110. The second message 430, when received by the user device 110, is configured to cause the user device 110 to notify a user 10 of the user device 110 that the user device 110 is successfully registered with the application 512.

Figure 7:
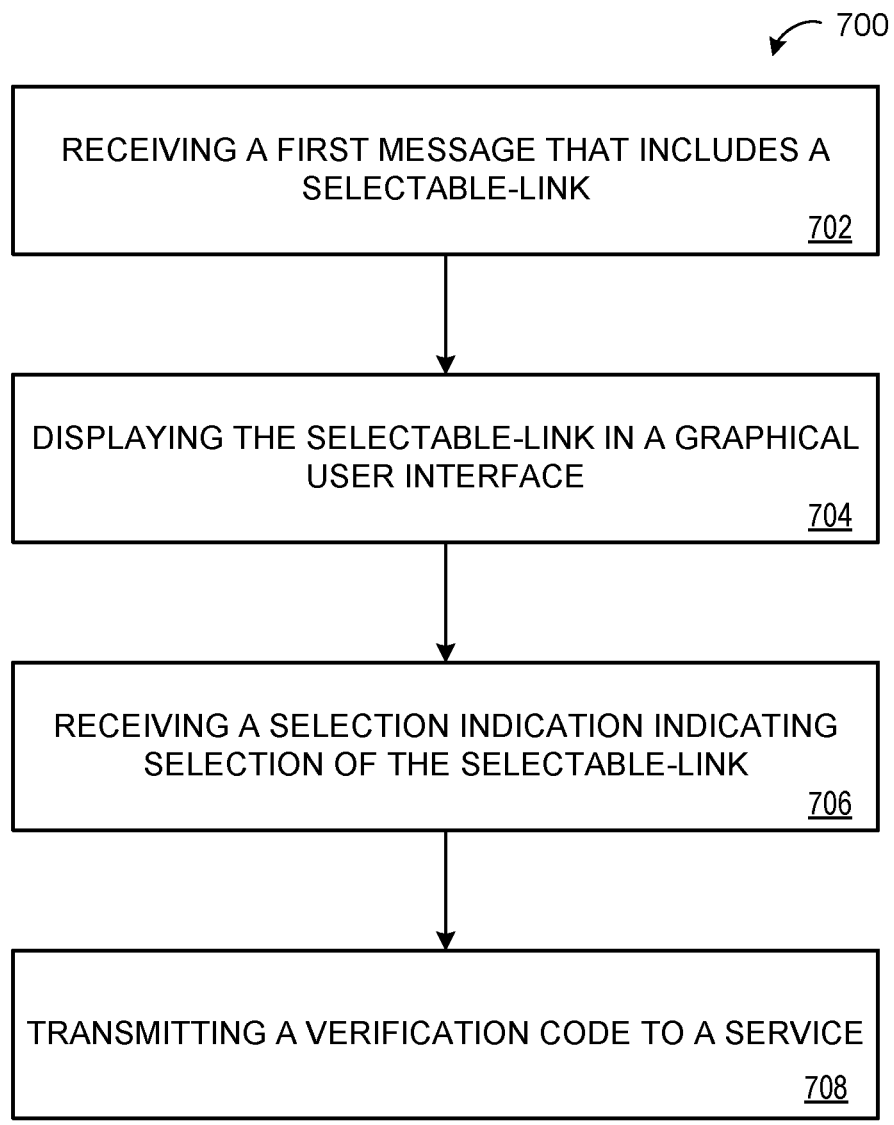
FIG. 7 is a flowchart of another example method for automatic link-based message verification.

FIG. 7 is a flowchart of an example method 700 for verifying a feature 222 of a user device 110. The flowchart starts at operation 702 by receiving, at data processing hardware 910 of a user device 110, a first message 230 that includes a selectable-link 231 for verifying a telephone number 342 associated with the user device 110. The selectable-link 231 includes metadata 234 corresponding to the telephone number 342, a country code 340, and a verification code 236 used to verify that the telephone number 340, 342 is associated with the user device 110. In some examples, the selectable-link 231 further includes an application identifier 232 identifying an application 512 that requires the country code and telephone number 340, 342 associated with the user device 110 for registering the user device 110 with the application 512. In this case, the method 700 also includes, in response to receiving the selection indication, launching, by the data processing hardware 910, the application 512 on the user device 110 using the application identifier 232 and populating, by the data processing hardware 900, the application 512 with the country code and telephone number 340, 342 associated with the user device 110.

The method 700 includes, at operation 704, displaying, by the data processing hardware 910, the selectable-link 231 in a graphical user interface executing on the user device 110. At operation 706, the method 700 includes receiving, at the data processing hardware 910, a selection indication indicating selection of the selectable-link 231 displayed on the graphical user interface. After receiving the selection indication, the method 700 includes, at operation 708, transmitting, by the data processing hardware 910, the verification code 236 over a network 122 to a service 125 in communication with the data processing hardware 910. The verification code 236 is configured to, in response to the service 125 receiving the verification code 236, cause the service 125 to verify that the telephone number 342 is associated with the user device 110.

In some implementations, after receiving the selection indication indicating selection of the selectable-link 231, the method 700 includes displaying, by the data processing hardware 910, a confirmation notification (e.g., a button) 514 on the graphical user interface and receiving, at the data processing hardware 910, a second selection indication indicating selection of the confirmation button 514 to verify that the telephone number 342 is associated with the user device 110. The method 700 also includes, in response to receiving the second selection indication, automatically transmitting, by the data processing hardware 910, the verification code 236 to the service 125 without requiring user input of the verification code 236.

Optionally, the method 700 includes, prior to receiving the first message 230, transmitting, by the data processing hardware 910, a request to the service 125 requesting to launch an application 512 on the user device 110 or to access a resource. The request includes the telephone number 342 associated with the user device 110 and the service 125 uses the telephone number 342 received by the request to transmit the first message 230 to the user device 110.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 8:
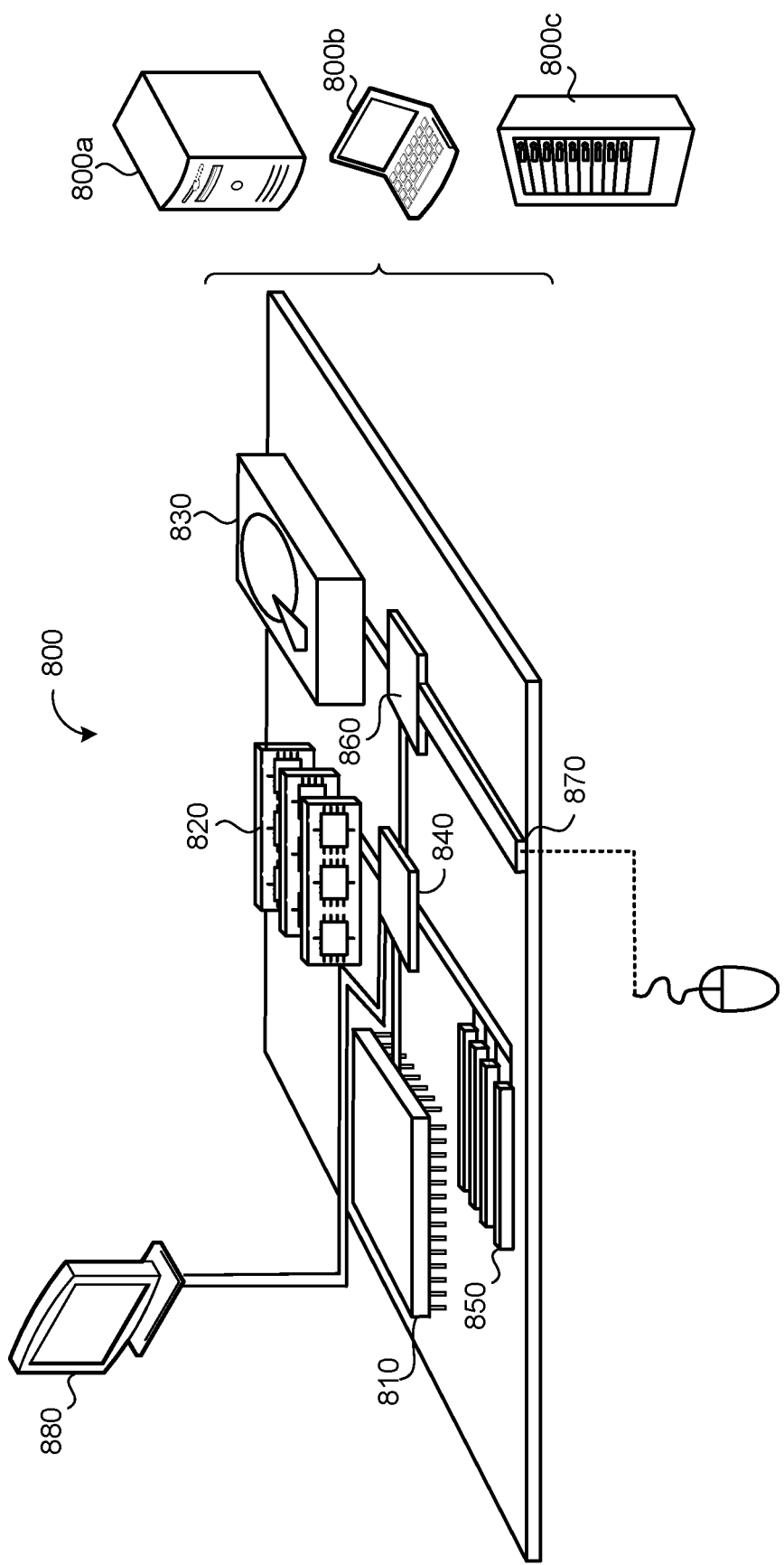
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 9:
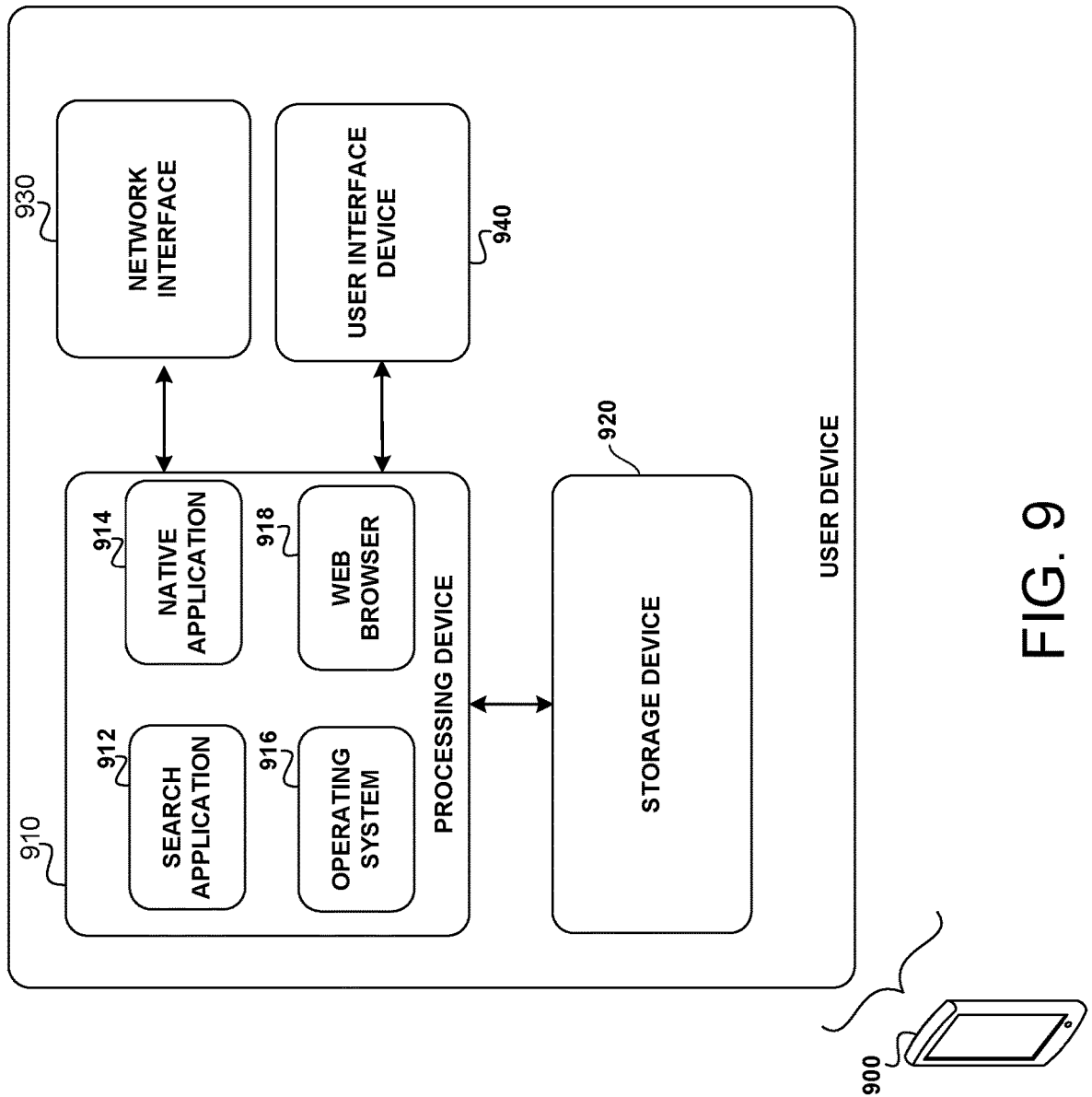
FIG. 9 is a schematic view of an example user device that may be used to implement the systems and methods described herein.

FIG. 9 is schematic view of data processing hardware of an example user device 900 that may be used to implement the systems and methods described in this document. In the illustrated example, the user device 900 includes a processing device 910, a storage device 920, a network interface 930, and a user interface 940.

The processing device 910 includes memory (e.g., RAM and/or ROM) that stores computer readable instructions and one or more processors that execute the computer readable instructions. In implementations where the processing device 910 includes two or more processors, the processors can execute in a distributed or individual manner. The processing device 910 may execute a search application 912, a web browser 918, an operating system 916, and one or more native applications 914, all of which may be embodied as computer readable instructions. The storage device 920 includes one or more computer readable mediums (e.g., hard disk drive and/or flash memory). The storage device 920 can store the computer readable instructions that make up the search application 912, the web browser 918, operating system 916, and the one or more native applications 914. The network interface 930 includes one or more devices that are configured to communicate with the network. The network interface 930 can include one or more transceivers for performing wired or wireless communication. Examples of the network interface 930 can include, but are not limited to, a transceiver configured to perform communications using the IEEE 802.11 wireless standard, an Ethernet port, a wireless transmitter, and a universal serial bus (USB) port. The user interface 940 includes one or more devices that receive input from and/or provide output to a user. The user interface 940 can include, but is not limited to, a touchscreen, a display, a QWERTY keyboard, a numeric keypad, a touchpad, a microphone, and/or speakers.

A number of implementations have been described. Nevertheless, it will be understood that various modifications may be made without departing from the spirit and scope of the disclosure. Accordingly, other implementations are within the scope of the following claims.

What is claimed is:

1. A method comprising:

receiving, at data processing hardware from a first user device registered with an application, an application registration request inviting an unregistered user device configured to execute the application to register the unregistered user device with the application, the application registration request comprising a unique registration feature for communicating with the unregistered user device and required for registering the unregistered user device with the application;

in response to receiving the application registration request, generating, by the data processing hardware, a selectable-link for registering the application on the unregistered user device, the selectable-link comprising:

an application identifier identifying the application; and a verification code used to verify that the unique registration feature is associated with the unregistered user device;

transmitting, by the data processing hardware, a first message comprising the selectable-link to the unregistered user device using the unique registration feature, the first message, when received by the unregistered user device, configured to cause the unregistered user device to:

display the selectable-link on a graphical user interface executing on the unregistered user device; and in response to receiving a selection indication indicating selection of the selectable-link displayed on the graphical user interface and indicating confirmation to register the unregistered user device with the application, automatically:

launch the application using the application identifier;

populate the application with the unique registration feature; and transmit the verification code to the data processing hardware; and in response to receiving the verification code from the unregistered user device, registering, by the data processing hardware, the unregistered user device with the application,
wherein registering the unregistered user device with the application when the verification code is received from the unregistered user device comprises:
determining whether a period of time from when the first message is transmitted to the unregistered user device until the verification code is received from the unregistered user device satisfies a validity period threshold; and
when the period of time satisfies the validity period threshold, registering the unregistered user device with the application.

2. The method of claim 1, wherein the first message, when received by the unregistered user device, is further configured to cause the unregistered user device to display a confirmation button in the graphical user interface after launching the application, the confirmation button, when selected by a user of the unregistered user device, indicating confirmation by the user to register the unregistered user device with the application and causing the unregistered user device to transmit the verification code to the data processing hardware without requiring user input of the verification code.

3. The method of claim 1, wherein registering the unregistered user device with the application when the verification code is received from the unregistered user device comprises:
determining whether a period of time from when the first message is transmitted to the unregistered user device until the verification code is received from the unregistered user device satisfies a validity period threshold; and
when the period of time dissatisfies the validity period threshold, preventing registration of the unregistered user device with the application.

4. The method of claim 3, further comprising, when the period of time dissatisfies the validity period threshold, transmitting a second message to the unregistered user device using a communication address identified by the unique registration feature that verifies control of the unregistered user device, the second message comprising a new verification code used to verify that the unique registration feature is associated with the unregistered user device.

5. The method of claim 1, wherein the selectable-link comprises a deep link that when selected is configured to cause the unregistered user device to one of install the application when the application is not already installed on the unregistered user device or open the application when the application is already installed on the unregistered user device.

6. The method of claim 1, wherein the first message when received by the unregistered user device is further configured to, after launching the application, automatically populate the application with registration information associated with the unregistered user device.

7. The method of claim 1, wherein the unique registration feature identifies a communication address for the unregistered user device, the communication address configured to verify control of the unregistered user device.

8. The method of claim 1, further comprising, after registering the unregistered user device with the application, transmitting a second message to the previously unregistered user device, the second message, when received by the previously unregistered user device, configured to cause the previously unregistered user device to notify a user of the previously unregistered user device that the previously unregistered user device is successfully registered with the application.

9. The method of claim 1, wherein the application provides a communication service enabling two or more user devices to communicate with each other, the communication service of the application requiring registration of a respective user device to allow the respective user device to communicate with one or more other registered user devices using the communication service.

10. A method comprising:
receiving, at data processing hardware of a user device unregistered with an application, a first message sent from a remote system to a telephone number of the user device in response to the remote system receiving a registration invitation from another user device registered with the application that invites the user device to register with the application, the first message comprising a selectable-link for registering the telephone number associated with the user device, the selectable-link comprising:
metadata corresponding to the telephone number; and
a temporary verification code generated by a verification service in communication with the user device, the temporary verification code used by the verification service to verify that the telephone number is associated with the user device;
displaying, by the data processing hardware, the selectable-link in a graphical user interface executing on the user device;
receiving, at the data processing hardware, a selection indication indicating selection of the selectable-link displayed on the graphical user interface;
in response to receiving the selection indication of the selectable-link, automatically transmitting, by the data processing hardware, the temporary verification code over a network to the verification service, the temporary verification code configured to, in response to the verification service receiving the temporary verification code, cause the verification service to verify that the telephone number is associated with the user device; and
after receiving the selection indication indicating selection of the selectable-link:
displaying, by the data processing hardware, a confirmation button on the graphical user interface;
receiving, at the data processing hardware, a second selection indication indicating selection of the confirmation button to verify that the telephone number is associated with the user device; and
in response to receiving the second selection indication, automatically transmitting, by the data processing hardware, the temporary verification code to the verification service without requiring user input of the temporary verification code.

11. The method of claim 10, wherein the selectable-link further comprises an application identifier identifying the application that requires the telephone number associated with the user device for registering the user device with the application, wherein the method further comprises, in response to receiving the selection indication:
launching, by the data processing hardware, the application on the user device using the application identifier; and automatically populating, by the data processing hardware, the application with the telephone number associated with the user device.

12. The method of claim 10, wherein the application provides a communication service enabling two or more user devices to communicate with each other, the communication service of the application requiring registration of a respective user device to allow the respective user device to communicate with one or more other registered user devices using the communication service.

13. A system comprising:
   data processing hardware; and
   memory hardware in communication with the data processing hardware, the memory hardware storing instruction that when executed on the data processing hardware cause the data processing hardware to perform operations comprising:
      receiving, from a first user device registered with an application, an application registration request inviting an unregistered user device configured to execute the application to register the unregistered user device with the application, the application registration request comprising a unique registration feature for communicating with the registration user device and required for registering the registration user device with the application;
      in response to receiving the application registration request, generating a selectable-link for launching the application on the unregistered user device, the selectable-link comprising:
         an application identifier identifying the application; and
         a verification code used to verify that the unique registration feature is associated with the unregistered user device;
      transmitting a first message comprising the selectable-link to the unregistered user device using the unique registration feature, the first message when received by the unregistered user device configured to cause the unregistered user device to:
         display the selectable-link on a graphical user interface executing on the unregistered user device; and
         in response to receiving a selection indication indicating selection of the selectable-link displayed on the graphical user interface and indicating confirmation to register the unregistered user device with the application, automatically:
            launch the application using the application identifier;
            populate the application with the unique registration feature; and
            transmit the verification code to the data processing hardware; and
      in response to receiving the verification code from the unregistered user device, registering the unregistered user device with the application,
      wherein registering the unregistered user device with the application when the verification code is received from the unregistered user device comprises:
         determining whether a period of time from when the first message is transmitted to the unregistered user device until the verification code is received from the unregistered user device satisfies a validity period threshold; and
         when the period of time satisfies the validity period threshold, registering the unregistered user device with the application.

14. The system of claim 13, wherein the first message, when received by the unregistered user device, is further configured to cause the unregistered user device to display a confirmation button in the graphical user interface after launching the application, the confirmation button, when selected by a user of the unregistered user device, indicating confirmation by the user to register the unregistered user device with the application and causing the unregistered user device to transmit the verification code to the data processing hardware without requiring user input of the verification code.

15. The system of claim 13, wherein registering the unregistered user device with the application when the verification code is received from the unregistered user device comprises:
   determining whether a period of time from when the first message is transmitted to the unregistered user device until the verification code is received from the unregistered user device satisfies a validity period threshold; and
   when the period of time dissatisfies the validity period threshold, preventing registration of the unregistered user device with the application.

16. The system of claim 15, wherein the operations further comprise, when the period of time dissatisfies the validity period threshold, transmitting a second message to the unregistered user device using a communication address identified by the unique registration feature of the unregistered user device that verifies control of the unregistered user device, the second message comprising a new verification code used to verify that the unique registration feature is associated with the unregistered user device.

17. The system of claim 13, wherein the selectable-link comprises a deep link that when selected causes the unregistered user device to one of install the application when the application is not already installed on the unregistered user device or open the application when the application is already installed on the unregistered user device.

18. The system of claim 13, wherein the first message when received by the unregistered user device is further configured to, after launching the application, automatically populate the application with registration information associated with the unregistered user device.

19. The system of claim 13, wherein the unique registration feature identifies a communication address for the unregistered user device, the communication address configured to verify control of the unregistered user device.

20. The system of claim 13, wherein the operations further comprise, after registering the unregistered user device with the application, transmitting a second message to the previously unregistered user device, the second message, when received by the previously unregistered user device, configured to cause the previously unregistered user device to notify a user of the previously unregistered user device that the previously unregistered user device is successfully registered with the application.

21. The system of claim 13, wherein the application provides a communication service enabling two or more user devices to communicate with each other, the communication service of the application requiring registration of a respective user device to allow the respective user device to communicate with one or more other registered user devices using the communication service.

22. A system comprising:
data processing hardware of a user device unregistered with an application; and
memory hardware in communication with the data processing hardware, the memory hardware storing instruction that when executed on the data processing hardware cause the data processing hardware to perform operations comprising:
receiving a first message sent from a remote system to a telephone number of the user device in response to the remote system receiving a registration invitation from another user device registered with the application that invites the user device to register with the application, the first message comprising a selectable-link for registering the telephone number associated with the user device, the selectable-link comprising:
metadata corresponding to the telephone number; and
a temporary verification code generated by a verification service in communication with the user device, the temporary verification code used by the verification service to verify that the telephone number is associated with the user device;
displaying the selectable-link in a graphical user interface executing on the user device;
receiving a selection indication indicating selection of the selectable-link displayed on the graphical user interface;
in response to receiving the selection indication of the selectable-link, automatically transmitting the temporary verification code over a network to the verification service, the temporary verification code configured to, in response to the verification service receiving the temporary verification code, cause the verification service to verify that the telephone number is associated with the user device; and
after receiving the selection indication indicating selection of the selectable-link:
displaying a confirmation button on the graphical user interface;
receiving a second selection indication indicating selection of the confirmation button to verify that the telephone number is associated with the user device; and
in response to receiving the second selection indication, automatically transmitting the temporary verification code to the verification service without requiring user input of the temporary verification code.

23. The system of claim 22, wherein the selectable-link further comprises an application identifier identifying the application that requires the telephone number associated with the user device for registering the user device with the application, wherein the operations further comprise, in response to receiving the selection indication:
launching the application on the user device using the application identifier; and
automatically populating the application with the telephone number associated with the user device.

24. The system of claim 22, wherein the application provides a communication service enabling two or more user devices to communicate with each other, the communication service of the application requiring registration of a respective user device to allow the respective user device to communicate with one or more other registered user devices using the communication service.

* * * * *